United States Patent [19]
Goodson et al.

[11] Patent Number: 5,715,277
[45] Date of Patent: Feb. 3, 1998

[54] APPARATUS AND METHOD FOR DETERMINING A SYMBOL RATE AND A CARRIER FREQUENCY FOR DATA TRANSMISSION AND RECEPTION

[75] Inventors: Richard L. Goodson; Lee T. Gusler, Jr., both of Huntsville; Gary D. Hunt, Gurley; Mickey C. Rushing, Harvest, all of Ala.

[73] Assignee: Motorola, Inc., Shaumburg, Ill.

[21] Appl. No.: 508,853

[22] Filed: Jul. 28, 1995

[51] Int. Cl.⁶ ............................................. H04B 1/38
[52] U.S. Cl. ................... 375/222; 375/227; 370/252; 370/276
[58] Field of Search ......................... 375/222, 225, 375/227, 377; 370/252, 276; 455/67.3

[56] References Cited

U.S. PATENT DOCUMENTS

| | | | |
|---|---|---|---|
| 4,309,773 | 1/1982 | Johnson et al. | 455/62 |
| 4,756,007 | 7/1988 | Qureshi et al. | 375/259 |
| 5,048,054 | 9/1991 | Eyuboglu et al. | 375/222 |
| 5,054,034 | 10/1991 | Hughes-Hartogs | 375/222 |
| 5,214,637 | 5/1993 | Sridhar et al. | 370/286 |

*Primary Examiner*—Young T. Tse
*Attorney, Agent, or Firm*—Nancy R. Gamburd; John W. Powell

[57] ABSTRACT

An apparatus and method for a data communications device, such as a modem (100, 101), to determine a symbol rate and carrier frequency combination, from a received probe signal, for optimizing a bit rate for data transmission and reception. The various embodiments utilizing a processor (108) or a digital signal processor (106) receive a probe signal, which also typically contains noise and other distortions. The various method and apparatus embodiments then determine signal to distortion ratios for a plurality of symbol rate and carrier frequency combinations (820), and other optimization parameters, such as channel characteristics and attenuation distortion parameters (830). These optimization parameters are then utilized to determine an optimal symbol rate and carrier frequency (840).

30 Claims, 3 Drawing Sheets

APPARATUS AND METHOD FOR DETERMINING A SYMBOL RATE AND A CARRIER FREQUENCY FOR DATA TRANSMISSION AND RECEPTION

FIELD OF THE INVENTION

This invention relates in general to data communications devices and, more particularly, to an apparatus and method for the determination of symbol rate and carrier frequency for data transmission and reception.

BACKGROUND OF THE INVENTION

Presently, data communications devices ("DCDs") and other data communications equipment ("DCE"), such as analog and digital modems, terminal adapters and routers, for example, are used to transfer or transport data between data terminal equipment ("DTE") such as personal computers, workstations, mainframe computers, and other terminals, over various communications channels such as telephone lines, T1 or ISDN lines, which also may be part of a computer network. Typically, the data is transmitted, received, or otherwise transferred in the form of a digitally encoded communication signal, which may include, for example, digitally encoded data transmitted on a carrier signal, having a predetermined or otherwise specified center frequency, that is modulated by a predetermined constellation (or transmit constellation) of signal points (such as quadrature amplitude modulation), at a particular (and usually predetermined) signaling or symbol rate (also referred to as a baud rate). In current and proposed systems, the signaling constellation may include from five hundred to over 1600 signaling points. For a given channel, the data throughput will vary as a function of both the symbol rate and the carrier frequency.

At the Sending or transmitting DCE, a carrier signal is thus modulated with the set of constellation signal points corresponding to the digital code or value to be transported over the channel. The channel, however, typically introduces or allows a variety of impairments or noise which affect the transmitted signal, such as amplitude and phase distortion, envelope delay distortion, non-linear distortion, additive noise, white noise, and other distortions. The level of distortion in the channel may limit the rate of data transport, as certain data rates, such as 28.8 Kbps, require reasonably high signal to distortion levels. Before the digital data is transported, therefore, a signaling rate and carrier frequency should be chosen which optimizes or maximizes the data throughput for a given channel.

The prior art has not addressed optimizing data throughput for a given channel by selection of the symbol rate and carrier frequency, largely because such selection was unavailable under the then current data transmission protocols. The prior art largely focused on other areas, using fixed symbol rates and carrier frequencies. Accordingly, a need remains for an apparatus and method to rapidly and efficiently determine a symbol rate and carrier frequency for data transmission, to optimize data throughput for a given type of channel and for given channel conditions, such as distortion levels.

DETAILED DESCRIPTION OF THE INVENTION

Figure 1:
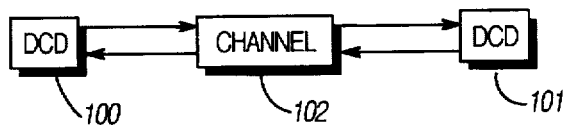
FIG. 1 is a block diagram illustrating modems connected to each other via a channel, for full duplex data transmission and reception.

FIG. 1 illustrates a first DCD 100, such as a first modem, connected to a second DCD 101, such as a second modem, via a channel 102. The modems typically operate in furl-duplex, such that each may transmit data and receive data at the same time. In order to compensate for various distortions and impairments which usually exist or occur in the channel during data transmission, various protocols and standards have evolved, such as the International Telecommunication Union (ITU) Recommendation V.34, involving the use of a probe signal having predetermined, defined characteristics, transmitted from the sending DCD to the receiving DCD, during the initial communication period (training period) in which the two devices train with each other. For example, under the V.34 protocol or standard, the probe signal involves the simultaneous transmission of a combination or sequence of twenty-one tones (frequencies) from 150 Hz to 3750 Hz, each tone of equal amplitude and having defined or known phase relationships, with each tone generally separated from other tones at intervals of 150 Hz or integer multiples of 150 Hz, and with some potential tones omitted, such as the 900 Hz, 1200 Hz, 1800 Hz, and 2400 Hz tones. The probe signal is transmitted at two power levels for certain amounts of time, a first high power level known as the L1 probe signal (or the L1 portion of the probe signal), which is set at 6 dB higher power than the nominal level, followed by a second nominal power level known as the L2 probe signal (or the L2 portion of the probe signal). In the United States, a nominal power level is typically −9 dBm or −10 dBm, and in Europe it is typically 0 dBm. The receiving DCD may analyze the received probe signal in light of the standard sequence assumed (or known) to have been transmitted, in order to determine such transmission parameters as the optimum symbol rate, the optimum carrier frequency, the carrier frequency offset, the timing frequency offset, the degree of non-linearity of the channel, the transmit power level, and the optimal bit rate. Various references concerning the use and analysis of probing signals include the ITU-T Recommendation V.34; Eyuboglu et al. U.S. Pat. No. 5,048,054, issued Sep. 10, 1991, entitled "Line Probing Modem"; Ling et al. U.S. Pat. No. 4,987,569, issued Jan. 22, 1991, entitled "Fast Training Echo Canceller"; and Sridhar et al. U.S. Pat. No. 5,214,637, issued May 25, 1993, entitled "High Speed Two Wire Modem".

In accordance with the present invention, the entire probe signal, both L1 and L2 portions, is processed by the local (receiving) DCD during the training period to determine certain parameters or factors of the received probe signal.

compared to the defined probe signal assumed (or known) to have been transmitted by the remote (transmitting) DCD. These parameters or factors include the signal to distortion ratios for the various probe signal frequencies; attenuation distortion levels for the various probe signal frequencies; and the channel characteristic, such as whether the channel is PCM, a tandem PCM link, or ADPCM. Based upon an empirical analysis of these various parameters or factors, the various embodiments of the present invention determine a plurality of symbol rate and carrier frequency combinations to optimize the bit rate for data transmission from the remote (transmitting) DCD, and stores that information in a register to be subsequently transmitted to the remote DCD.

Figure 2:
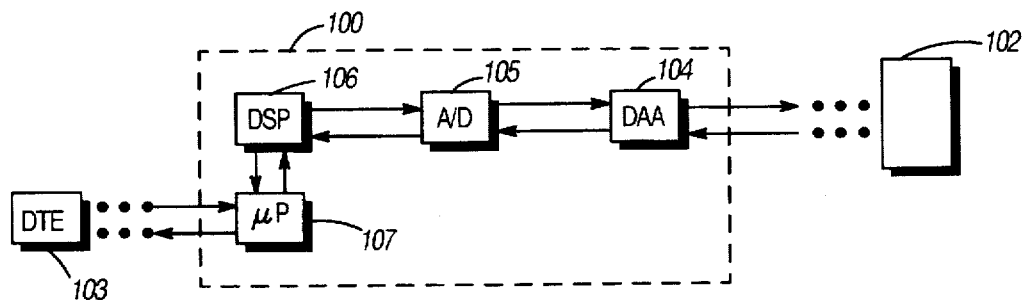
FIG. 2 is a block diagram illustrating a first embodiment of a modem or other DCD in accordance with the present invention.

FIG. 2 is a block diagram illustrating a first embodiment of a modem or other DCD in accordance with the present invention. As shown in FIG. 2, a modem 100 is coupled or connected to a DTE 103, such as a computer, and coupled to a channel 102, for data transmission and reception. Within the modem 100, a data access arrangement 104 known as a "DAA" receives an analog signal transmitted on the channel 102. DAAs are known in the prior art and may be made of a variety of discrete components, including analog multiplexers, resistors, capacitors, and operational amplifiers, or may be embodied in whole or part as an integrated circuit, and performs such functions as impedance matching and power level adjustment. Typically connected to the DAA 104 is an analog-to-digital and digital-to-analog converter 105, referred to herein as an analog-digital ("A/D") converter (or equivalently a coder-decoder known as a "codec"), such as an SGS Thompson ST 7544 or ST 7545, which converts an analog signal received from the channel 102 to sampled, digital form, and converts sampled, digital information to analog form for transmission over the channel 102. The A/D converter 105 is then connected to a digital signal processor ("DSP") 106, such as a Motorola M56002. The DSP 106 is used in a first embodiment of the invention herein, performing the various functions described in detail below. The DSP 106 is connected to a microprocessor 107, such as a Motorola M68302, which may be coupled to a DTE 103 to transmit and receive digital information.

Figure 3:
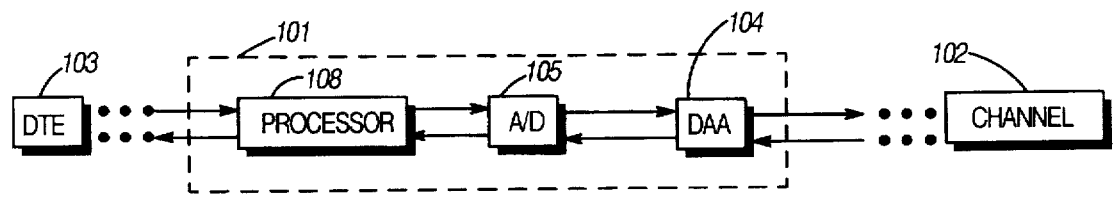
FIG. 3 is a block diagram illustrating a second embodiment of a modem or other DCD in accordance with the present invention.

FIG. 3 is a block diagram illustrating a second embodiment of a modem or other DCD in accordance with the present invention. Referring to FIG. 3, the DAA 104 and A/D converter (or codec) 105 perform the same functions, may be the identical components, and are similarly connected as previously discussed with reference to FIG. 2. In contrast with the modem 100 of FIG. 2, however, FIG. 3 illustrates a modem or other DCE 101 containing a processor 108, such as a Motorola M68356, which performs the functions of both the DSP 106 and the microprocessor 107 of FIG. 2. The processor 108 is used in a second embodiment of the invention herein, also performing the various functions described in detail below. The processor 108 may also be coupled to a DTE 103 to transmit and receive digital information. As a consequence of the interchangeability of a DSP with a processor in these various embodiments, the terms DSP and processor (or microprocessor) are used interchangeably and inclusively herein, such that use of one term may be interpreted to mean and include the various other processor embodiments.

The following is a list of symbols used in this document and their meanings $x(n)$ The complex analytic output of the initial processor consisting of the probe signal received from the channel. This received probe signal is a set of tones at frequency multiples of $1/T$.

$f_i$ The frequency of the $i^{th}$ tone.

$A_i$ The amplitude of $x(n)$ at frequency $f_i$.

L1 The probe signal transmitted at 6 dB above nominal tranmit power.

L2 The probe signal transmitted at nominal transmit power.

$G_u$ The gains associated with L1 and L2.

T The period of the probe signal and the reciprocal of the frequency spacing between tones.

The square root of $-1$, as commonly used in physics and engineering.

P The number of samples of $x(n)$ in one period of the received probe signal.

L The number of FFTs in a set.

M The number of periods delay between adjacent FFTs.

K The number of periods consumed by each FFT.

$w(m)$ The window function for the FFTs.

$R_{n,i}(k/KT)$ The output of the $l^{th}$ FFT at time n.

$X(k/KT)$ The averaged FFT result.

SDR Signal to distortion ratio at output of a decision feedback equalizer.

$B_n$ Noise bandwidth of the window function $w(m)$.

$B_p$ Bandwidth of the probe signal.

$f_{sym}$ Symbol rate.

$f_c$ Carrier frequency.

$S(f_i)$ Discrete signal power spectrum.

$N(f_i)$ Discrete noise power spectrum.

Figure 4:
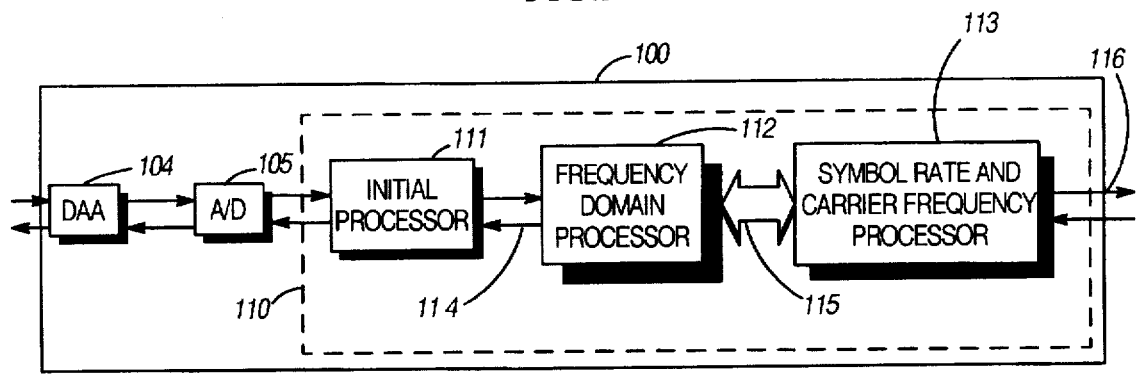
FIG. 4 is a block diagram illustrating the functional components of an embodiment of the present invention.

FIG. 4 is a block diagram which illustrates the functional components of an embodiment of the present invention. Referring to FIG. 4, as mentioned above, the invention herein may be implemented or embodied using a DSP (or as a processor) 110. Accordingly, as used herein, "processor" shall refer to and include a digital signal processor, a microprocessor, or any other integrated circuit which may combine the functions of a DSP and microprocessor. As discussed in more detail below, the DSP or processor 110 has three major programmable functional blocks or components, an initial processor 111, a frequency domain processor 112, and a symbol rate and carrier frequency processor 113.

Referring to FIG. 4, a remote modem or other remote DCD typically transmits a probe signal, via a channel 102 (such as the general or public switched telephone network ("PSTN")), generated using a probe generator. The channel 102 usually distorts the probe signal and adds noise. The A/D converter 105 samples the received channel output (the probe signal), and the initial processor 111 of the local modem or other local DCE 120 converts the received signal into a complex analytic signal. The frequency domain processor 112 converts the complex analytic signal from the time domain into the frequency domain, generates information concerning the signal spectrum and the noise spectrum, and transmits this information to the symbol rate and carrier frequency processor 113 via bus 115. The symbol rate and carrier frequency processor 113 determines the signal to distortion ratios for the various probe signal frequencies, and determines various other optimization parameters such as a channel characteristic and an attenuation distortion parameter. The symbol rate and carrier frequency processor 113 uses these optimization parameters to determine an optimal combination or a plurality of symbol rate and carrier frequency combinations, for an optimal or maximal bit rate (such as 28.8 Kbps under the V.34 protocol), given the conditions of the channel, for use by the remote modem. These blocks, parameters and signals are described in greater detail below.

Continuing to refer to FIG. 4, both the local modem 100 and the remote modem transmit a probe signal to the other, during the initial training period. The probe signal having a period T (for the 150 Hz tone) consists of a sequence of equal amplitude tones at frequency multiples (or intervals) of 1/T. Also as mentioned above, certain multiples of 1/T frequencies have zero amplitude (i.e., are omitted). The probe signal also has two portions or segments, L1 and L2, with the transmit power level of L1 6 dB higher than the nominal power level of L2. Ideally, the probe signal may be represented as:

$$G_u \text{Re} \left\{ \sum_i e^{j(2\pi f_i t + \beta_i)} \right\}$$

where $f_i$ is the frequency of the $i^{th}$ tone of the probe signal (and "T" is incremented in integer multiples of 1/T), j is the square root of $-1$, $\beta_i$ is the phase angle associated with the $i^{th}$ tone, GU is the gain associated with the probe signal, such that $G_1$ is the specific gain associated with L1 and $G_2$ is the specific gain associated with L2, and Re is the real operator.

As mentioned above, the channel 102 typically distorts the probe signal in several ways. For example, it can introduce amplitude distortion, phase distortion, envelope delay distortion, non-linear distortion, carrier and timing frequency offset, ADPCM, tandem PCM, and additive noise. The received probe signal (received by the local modem 100 from the channel 102) may then be represented as:

$$\text{Re} \left\{ G_u \sum_i A_i e^{j(2\pi f_i t + \gamma_i)} \right\} + N_2(t)$$

where $A_i$ is the amplitude of of the $i^{th}$ tone of the received probe signal, $\gamma_i$ is phase angle associated with the $i^{th}$ tone, and $N_2(t)$ is the channel-induced distortion.

Figure 5:
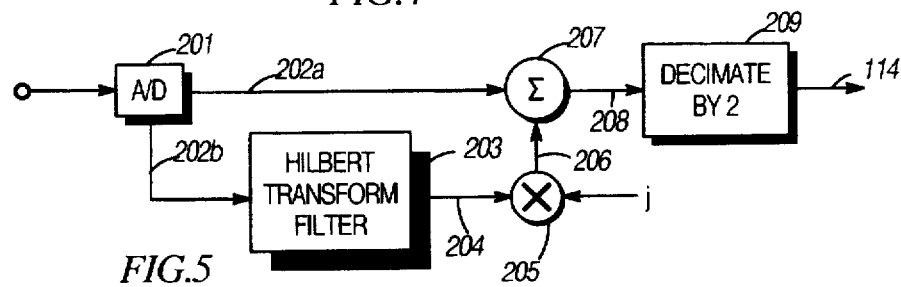
FIG. 5 is a block diagram illustrating the initial processor component of a processor in accordance with the present invention.

FIG. 5 is a block diagram illustrating the initial processor component 111 of a processor used in accordance with the present invention. Referring to FIG. 5, the initial processor 111 includes an A/D (analog-digital) converter (or codec) 201 which samples the received probe signal at a rate 2P/T, where P is the number of samples in one period of the received probe signal. The initial processor produces a sampled, received probe signal transmitted on line 202b to a Hilbert transform filter 203, which may have the following ideal transfer function:

$$H(e^{j2\pi f}) = \begin{cases} -j, & f > 0 \\ j, & f < 0 \end{cases}$$

where j is the square root of $-1$. The output signal on line 204 from the Hilbert transform filter 203 is multiplied by j in multiplier 205. The combined transfer function of the Hilbert transform filter 203 and the multiplier 205 may be the following (ideal) transfer function:

$$jH(e^{j2\pi f}) = \begin{cases} 1, & f > 0 \\ -1, & f < 0 \end{cases}$$

producing an output signal on line 206. The sum of the sampled probe signal (on line 202a) and the output signal from the combined Hilbert transform filter and multiplier (on line 206), using the summer 207, yields a complex analytic signal on line 208. This complex analytic signal is zero for negative frequencies. Because the negative frequency components have been eliminated, the sample rate may be reduced (decimated) in block 209 by a factor of 2 without aliasing, resulting in an output on line 114 from the initial processor 111 with a sample rate P/T which may be represented as:

$$x(n) = G_u \sum_i A_i e^{j(2\pi f_i \frac{nT}{P} + \lambda_i)} + N_1(n)$$

where n is the sequence number in a sequence of samples (discrete time index), $\lambda_i$ is a phase angle, and $N_1(n)$ is the complex analytic channel-induced distortion.

Figure 6:
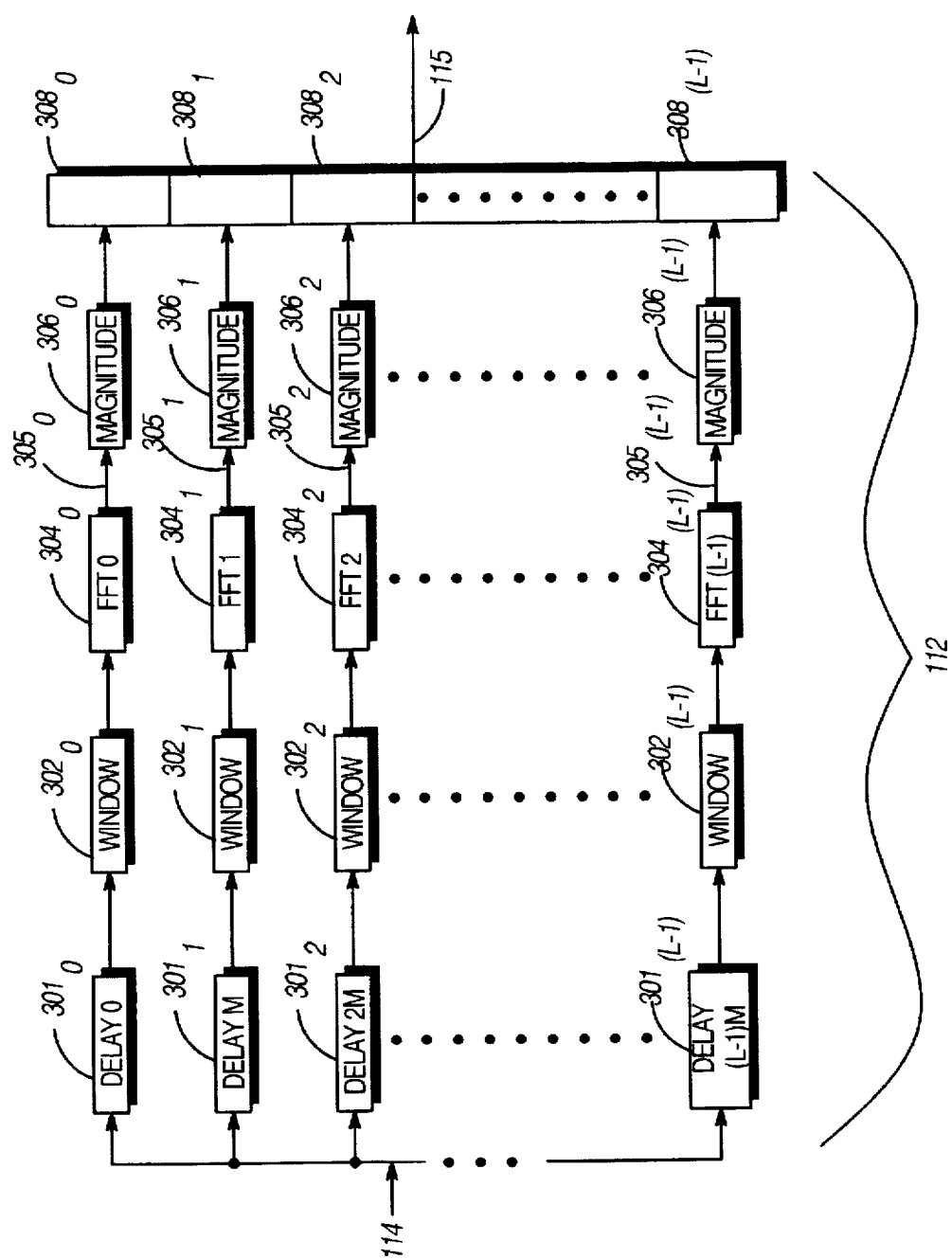
FIG. 6 is a block diagram illustrating the frequency domain processor component of a processor in accordance with the present invention.

FIG. 6 is a block diagram illustrating the frequency domain processor component 112 of a DSP or processor used in accordance with the present invention. In the preferred embodiment, the frequency domain processor component 112 contains a Fourier transform block 304, to produce a set of L identical Fast Fourier Transforms ("FFTs"), indexed from 0 to L-1, the outputs of which are averaged in block 308 to increase the signal to noise ratio (SNR) at each tone frequency $f_i$ of the probe signal. The complex analytic signal x(n) is delayed in delay block 301 by LMP samples, where L,M, and P are integers, L is the number of FFTs in a set, M is the number of periods of delay between adjacent FFTs, and as indicated above, P is the number of samples in one period of the received probe signal. In a preferred embodiment, L has two values, with L=8 for the L1 portion of the probe and L=32 for the L2 portion of the probe, M is 2, and P is 32.

Referring to FIG. 6, the sampled, received probe signal from the initial processor 111 is applied to L delay units $301_0$ through $301_{L-1}$. The delay applied by each unit is fixed, and ranges from 0 to (L-1)M periods, corresponding to the FFT index 0 to L-1, where M is an integer. The output of each delay unit (a total of L units) is applied to a KP-point window function, blocks $302_0$ through $302_{L-1}$ (also a corresponding total of L window function blocks). In the preferred embodiment, a set of L windows ( such as Blackman-Harris windows) are used to reduce sidelobe amplitude by more than 60 dB midway between the tone frequencies, for noise measurement. A set of L Fast Fourier Transforms is performed in blocks $304_0$ through $304_{L-1}$, in which each FFT consumes K probe periods of data. In the preferred embodiment, K=8. The output of each FFT appearing on lines $305_0$ through $305_{L-1}$ may be represented as:

$$R_{n,l}\left( \frac{k}{KT} \right) = \frac{1}{KP} \sum_{m=0}^{KP-1} x(n - lMP - KP + 1 + m)w(m) e^{\frac{-j2\pi mk}{KP}}$$

where w(m) is the window function, k is the frequency index, and l is the FFT index.

Continuing to refer to FIG. 6, magnitudes of the FFT outputs are determined in blocks $306_0$ through $306_{L-1}$, and are averaged in blocks $308_0$ through $308_{L-1}$ to increase the signal to noise ratio at each tone frequency $f_i$. In the preferred embodiment, each FFT utilizes 256 samples of the incoming signal, and L (8 or 32) FFTs for each tone frequency are averaged in blocks $406_0$ through $406_{L-1}$, to create an L-fold redundancy which may tend to reduce any components attributable to random noise and increase the accuracy of the determination of the signal to noise ratios. The averaged magnitudes of these Fourier transform blocks (sampled at a time index n such that all FFTs have been completed) appears on line or bus 115, for input into the symbol rate and carrier frequency processor 113, and may be represented as:

$$X_n\left( \frac{k}{KT} \right) = \frac{1}{L} \sum_{l=0}^{L-1} \left| R_{n,l}\left( \frac{k}{KT} \right) \right|$$

Figure 7:
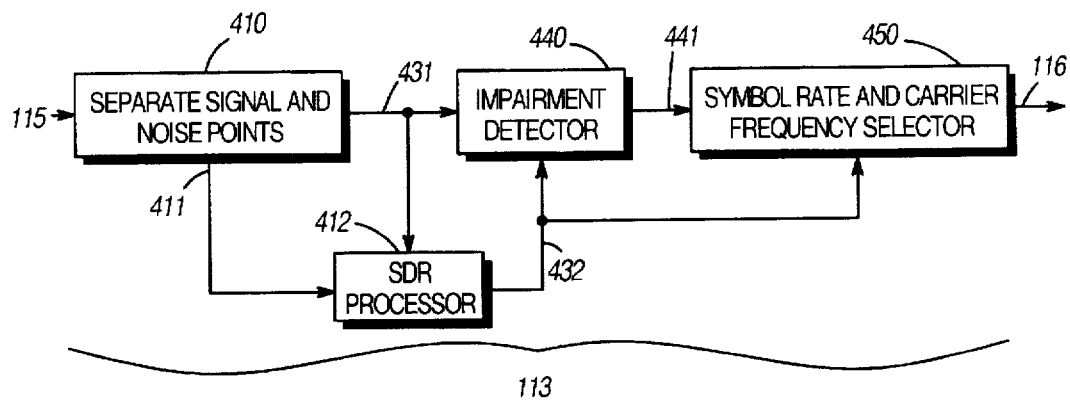
FIG. 7 is a block diagram illustrating the symbol rate and carrier frequency component of a processor in accordance with the present invention.

FIG. 7 is a block diagram illustrating the symbol rate and carrier frequency processor 113 of the preferred embodiment of the present invention. In block 410, the averaged magnitudes of the FFTs corresponding to signal points (from the received probe signal) are separated from the averaged magnitudes of the FFTs corresponding to noise points. The signal amplitudes (averaged magnitudes) are $S_n(f_i)=X_n(f_i)$ for each frequency $f_i$, and are output on line 431. In the preferred embodiment, the noise amplitudes (averaged magnitudes) are chosen to correspond to a given tone frequency of the received probe signal, and are $N_n(f_i)=[X_n(f_i-3/2T)+X_n(f_i+½T)+X_n(f_i+½T)]/3$ for each frequency $f_i$, which are then input on line 411 to the signal to distortion ("SDR") processor 412. In other words, the signal amplitudes are determined by measuring the amplitude of the frequency domain signal at the various probe tone frequencies; each noise amplitude corresponding to or associated with a given probe tone frequency is determined by averaging the amplitudes of the frequency domain signal at two or three neighboring frequencies, which frequencies are each midway between several adjacent probe tone frequencies (on either side of the given probe tone frequency). For example, for the probe tone at 1500 Hz, the amplitude of the corresponding noise frequency may be measured as an average of the noise magnitudes at 1425 Hz and 1575 Hz, or at 1275 Hz, 1425 Hz and 1575 Hz, and so on.

Continuing to refer to FIG. 7, the SDR (signal to distortion ratio) processor 412 utilizes the signal amplitudes (on line 431) and the noise amplitudes (on line 411), and predicts a signal to distortion ratio at the output of a decision feedback equalizer (DFE) for each combination of carrier frequency and symbol rate under consideration, such as a symbol rate of 3200 with a low carrier frequency of 1829 Hz or with a high carrier frequency of 1920 Hz, or a symbol rate of 2400 with a low carrier frequency of 1600 Hz or with a high carrier frequency of 1800 Hz. Table 2 of the Recommendation V.34 provides for eleven symbol rate and carrier frequency combinations, and various data or bit rates, ranging from 2400 bps to 28.8 Kbps, may require one or more particular symbol rate and carrier frequency combinations. In addition, certain bit rates, especially faster bit rates such as 28.8 Kbps, typically require reasonably high signal to distortion ratios. The SDR value is determined across the spectrum appropriate for the given symbol rate and carrier frequency combination. For example, the SDR value for a symbol rate of 3200 and a low carrier of 1829 may be calculated across the spectrum from 229 Hz to 3429 Hz. The SDR value is calculated for both the high power probe portion (L1) and the low power probe portion (L2). The SDR at the output of a DFE may be determined if the power spectrum of the signal and noise at the input to the DFE is known. The SDR is determined as follows:

$$\frac{1}{SDR} = e^{\frac{1}{f_{sym}}} \int_{f_c - \frac{f_{sym}}{2}}^{f_c + \frac{f_{sym}}{2}} \ln \frac{N(f)}{S(f)+N(f)} \, df$$

where $S(f)$ and $N(f)$ are the power spectral density of the signal and noise, respectively, and $f_{sym}$ is the symbol rate and $f_c$ is the carrier frequency for the particular symbol rate and carrier frequency combination under consideration, from among the plurality of combinations of symbol rates and carrier frequencies available in the various protocols.

For the discrete frequency case, this equation may be approximated as follows:

$$\frac{1}{SDR} = \left[ \prod_i \frac{N(f_i)}{S(f_i)\frac{TB_nB_p}{f_{sym}}+N(f_i)} \right]^{\frac{1}{NumTones}}$$

where the product is over the values of "i" such that $$f_c - \frac{f_{sym}}{2} \leq f_i \leq f_c + \frac{f_{sym}}{2}$$

and NumTones is the number of tones included in the product. The term "$TB_n$" is a correction factor for the noise power spectrum, correcting for the noise bandwidth of the window (block 302, FIG. 6), $B_n$, preceding the FFT, making the measured noise power the same as it would be if it were measured in the bandwidth 1/T. In addition, the term "$B_p/f_{sym}$" is a correction factor for the probe signal power spectrum. The probe signal is a wideband signal, with bandwidth, $B_p$, exceeding the bandwidth of the actual modem signal, $f_{sym}$. This term makes the power spectral density of the probe signal the same as it would be if it occupied only the modem bandwidth, $f_{sym}$. In the preferred embodiment, $TB_n$ is 0.25 and $B_p$ is 3750 Hz.

Since the SDR is needed in dB, and to eliminate problems caused by fixed point multiplication implementation, the SDR equation for the discrete frequency case is further approximated by the logarithm $$\log(SDR) = \frac{1}{NumTones} \sum_i \log\left( S(f_i)\frac{TB_nB_p}{f_{sym}} + N(f_i) \right) - \log(N(f_i))$$

The logarithms are approximated using known techniques, such as combining simple shifts and a lookup table. In the preferred embodiment, eleven signal to distortion ratios (one for each baud rate and carrier frequency combination) are determined at each L1 and L2 power level, for a total of 22 SDRs output on line 432 to the impairment detector 440 and the symbol rate and carrier frequency selector 450.

The impairment detector 440 utilizes the average magnitudes of the signal points for each probe tone frequency, on line 431 from block 410 and the frequency domain processor 112, and utilizes the SDR values on line 432 from the SDR processor 412, and determines the type of channel impairments, if any, which may be present. These various factors are referred to as a plurality of optimization parameters. In addition to detecting ADPCM and tandem PCM links, as discussed below, the impairment detector computes various slopes across the spectrum (or band) of each symbol rate. In the preferred embodiment, the impairment detector 440 assumes a correlation between envelope delay distortion and attenuation distortion, such that excessive attenuation distortion may indicate excessive envelope delay beyond the capacity of the equalizer. Accordingly, if the attenuation distortion (as an optimization parameter)is greater than a given parameter, empirically determined based upon the given equalizer employed, certain symbol rates will not be practical and may be excluded from consideration. In the preferred embodiment, two slopes are measured. The first slope is determined between 1050 Hz and 150 Hz, and if the magnitude of the difference in amplitude at these two frequencies is greater than 30 dB, then the 3200 and 3429 symbol rates are excluded. The second slope is determined between 1050 Hz and 3750 Hz, and if the magnitude of the difference in amplitude at these two frequencies is greater than 28 dB, then the 3429 symbol rate is excluded. These results are summarized in TABLE A.

The impairment detector also determines a channel characteristic, whether the channel is or has PCM, ADPCM, or tandem (or multiple) PCM links, which may empirically indicate that certain symbol rates should not be utilized. The channel characteristic may be included in the plurality of optimization parameters. In the preferred embodiment, ADPCM and PCM are detected and distinguished using the SDR for a 2400 Hz symbol rate from the high power portion of the probe signal and the low power portion of the probe signal, referred to as SDR(HighPower) and SDR (LowPower), respectively. In a typical analog channel, there is typically a 6 dB difference between SDR(HighPower) and SDR(LowPower); PCM in general (i.e., either ADPCM or tandem PCM) is detected if SDR(HighPower) and SDR (LowPower) are reasonably close, for example, within 3 dB of each other. A tandem PCM link is detected and distinguished if the slope between 1050 Hz and 3750 Hz is greater than 28 dB. An ADPCM link is detected and distinguished if the SDR(LowPower) is less than 32 dB. These dB values were empirically determined for worst case channels, and other levels may be used for other situations. The criteria for detection of ADPCM and PCM are summarized in TABLE B. As indicated in TABLE A, if a tandem PCM link is detected, the 3429 symbol rate is excluded, and if ADPCM is detected, the 3200 and 3429 symbol rates are excluded. It should be emphasized that these criteria were empirically determined, and may vary depending upon the type of modem, the type of equalizer, and other factors, such as network equipment.

Using the ADPCM, tandem PCM, and slope detections, the impairment detector 440 determines which symbol rate (s) (if any) will be excluded from being selected as an optimum symbol rate. A symbol rate mask is output on line 441 from the impairment detector 440, indicating which symbol rates are to be excluded, and transmitted to the symbol rate and carrier frequency selector 450. TABLE A summarizes the conditions or impairments, and the symbol rates which are correspondingly excluded. If more than one condition is met, and if a symbol rate is excluded due to any of those conditions, then that symbol rate is excluded, as indicated in TABLE A.

The symbol rate and carrier frequency selector 450 computes and determines the maximum bit rate allowed, for each symbol rate and carrier frequency combination, based on the SDR value input (from the nominal power level portion of the probe signal) from the SDR processor 412 on line 432. Some possible symbol rates may also have been excluded by the impairment detector 440. The symbol rate and carrier frequency combination which yields the highest maximum bit rate and is not excluded by the impairment detector is output as the optimum symbol rate and carrier frequency combination. In the preferred embodiment, these values am stored as a look-up table in memory. The look-up table may be formulated by determining, for every symbol rate and carrier frequency combination, the minimum SDR needed for each potential bit rate. For example, certain minimum SDRs are needed, at a symbol rate of 2400, to have bit rates extending from 2400 bps to 21,600 bps, with higher SDRs typically needed for the faster bit rates. For any given symbol rate and carrier frequency combination, it may have a sufficiently high SDR for any number of bit rates, and if so, the maximum allowable bit rate for that SDR is selected by the symbol rate and carrier frequency selector 450. For example, at a symbol rate of 3429 and a carrier frequency of 1959 Hz, there may be a sufficiently high SDR for 28.8 Kbps, 24 Kbps, 19.2 Kbps, and so on; in that event, the symbol rate and carrier frequency selector 450 will select the maximum bit rate, 28.8, for that symbol rate and carrier frequency combination. Similarly, for each symbol rate, the carrier frequency with the highest SDR is selected, for a correspondingly optimal bit rate, or if the same bit rate, the better SDR. TABLE C provides an example of the minimum SDRs needed to receive a given bit rate at a given symbol rate. Then, using this SDR, the maximum bit rate for this symbol rate can be determined, as indicated in TABLE C.

Once this information is determined, during the training period, the receiving modem transmits this information concerning allowable bit rates to the transmitting modem. In the preferred embodiment, for each symbol rate, the receiving modem transmits information concerning the maximum projected bit rate for a particular symbol rate, and for that symbol rate, the particular carrier frequency which provided the greater SDR allowing that bit rate. Typically during the training period, the transmitting and receiving modems then determine the optimal bit rate, of these allowed bit rates, for each to transmit and receive (as one may have a greater capacity than the other).

In the preferred embodiment, moreover, in order to extend the dynamic range, an estimate of the carrier frequency offset is computed while the first KP samples of probe signal are being consumed. The first KP samples and all subsequent samples are rotated by this estimate of the carrier frequency, as disclosed in a related application Ser. No. 08/496,640 filed Jun. 29, 1995 by the inventors herein, entitled "Apparatus and Method for Determining Carrier Frequency Offset and Timing Frequency Offset for Data Transmission and Reception", now U.S. Pat. No. 5,654,982.

In summary, an embodiment of the invention may be described as a modem 100 for data transmission and reception, the modem having an initial training period for determining a transmit power level from a transmitted probe signal received via a channel, with the transmitted probe signal having a sequence of a plurality of tones having predetermined frequency, amplitude and phase characteristics, the transmitted probe signal having a first power level and a second power level, and the transmitted probe signal received for a minimum duration for each of the first and second power levels to form a plurality of sets of transmitted tones. The modem 100 then comprises: first, a data access arrangement 104 coupleable to the channel 102 to receive the transmitted probe signal, to form a received probe signal; second, an analog-digital converter 105 coupled to the data access arrangement 104 to sample and convert the received probe signal to form a plurality of sets of received probe tones; and third, a processor (106, 108 or 110) coupled to the analog-digital converter (105) to receive the plurality of sets of received probe tones. The processor (106, 108 or 110) is responsive to determine an average probe signal level for each tone frequency of the plurality of sets of received probe tones to form a set of probe signal average power levels, and to determine an average noise level for a plurality of noise frequencies to form a set of average noise levels. The processor (106, 108 or 110) is further responsive to determine a plurality of signal to distortion ratios, each of the plurality of signal to distortion ratios corresponding to a symbol rate and carrier frequency combination from a plurality of combinations of symbol rates and carrier frequencies, to form a set of signal to distortion ratios. Lastly, the processor (106, 108 or 110) is further responsive to form a plurality of optimization parameters, the plurality of optimization parameters including the set of signal to distortion ratios; and based upon the plurality of optimization parameters, the processor (106, 108 or 110) is further responsive to determine a selected symbol rate and carrier frequency combination from the plurality of combinations of symbol rates and carrier frequencies, wherein the selected symbol rate and carrier frequency combination may corresponds to an optimal bit rate of a plurality of bit rates.

Figure 8:
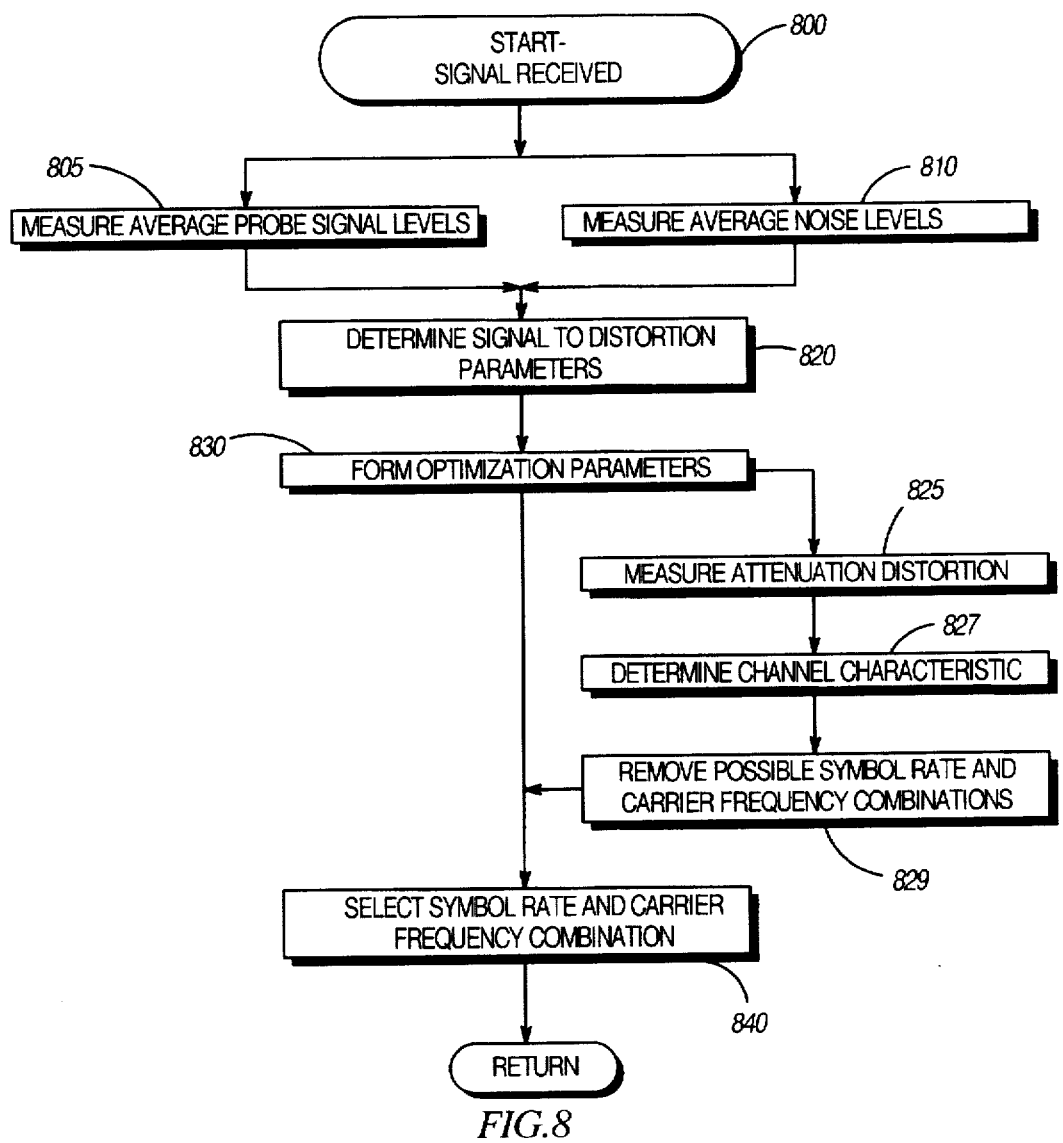
FIG. 8 is a flow chart illustrating a method in accordance with the present invention.

FIG. 8 is a flow chart illustrating a method in accordance with the present invention. Referring to FIG. 8, the process starts with the received probe signal, start step 800. As discussed above, the transmitted probe signal is received via a channel, the transmitted probe signal having a sequence of a plurality of tones having predetermined frequency, amplitude and phase characteristics, the transmitted probe signal having a first power level and a second power level, the transmitted probe signal received for a minimum duration for each of the first and second power levels to form a received probe signal having a plurality of sets of received probe tones, with each set of received probe tones having a plurality of probe tone frequencies.

Continuing to refer to FIG. 8, the method proceeds with measuring an average probe signal level for each probe tone frequency of the received probe signal to form a set of probe signal average power levels, step 805, and measuring an average noise level for a plurality of noise frequencies for to form a set of average noise levels, step 810. As discussed above, these steps involve sampling and transforming the probe signal and associated noise into a complex analytic signal, analogous to the processing provided by the initial processor 111 in FIGS. 4 and 5. For the high power portion of the probe signal, the complex analytic signal is then windowed and processed by FFTs to form L FFTs, the magnitudes of which are then averaged to form a high power averaged FFT. For the low power portion of the probe signal, the complex analytic signal is windowed and processed by FFTs to form L FFTs, the magnitudes of which are then averaged to form a low power averaged FFT. These steps are analogous to the processing provided by the frequency domain processor 112 in FIGS. 4 and 6.

Next, the method determines a plurality of signal to distortion ratios, each of the plurality of signal to distortion ratios corresponding to a symbol rate and carrier frequency combination from a plurality of combinations of symbol rates and carrier frequencies, to form a set of signal to distortion ratios, step 820, analogous to the processing provided in the SDR processor 412 in FIG. 7. The method then forms a plurality of optimization parameters with the plurality of optimization parameters including the set of signal to distortion ratios, step 830. Then, based upon the plurality of optimization parameters, the method determines a selected symbol rate and carrier frequency combination from the plurality of combinations of symbol rates and carrier frequencies, which may correspond to an optimal bit rate of a plurality of bit rates, step 840.

Continuing to refer to FIG. 8, other steps may also be included in the method, such as measuring attenuation distortion at a plurality of probe tone frequencies to form an attenuation distortion parameter, the attenuation distortion parameter included in the plurality of optimization parameters, step 825, and determining a channel characteristic from the set of signal to distortion ratios, the channel characteristic included in the plurality of optimization parameters, step 827. In addition, the method may also include removing a corresponding symbol rate from the plurality of combinations of symbol rates and carrier frequencies, the corresponding symbol rate selected based upon the attenuation distortion parameter or the channel characteristic, step 829. These steps are analogous to the processing performed by the impairement detector 440 in FIG. 7.

A major advantage of a modem having this symbol rate and carrier frequency determination capability, in accordance with the present invention, is that the adverse effects of noise are minimized, and the modem is able to rapidly determine the optimum symbol rate and carrier frequency by processing a predefined probe signal, to optimize the bit rate for data transmission and reception. Another advantage of a modem with rapid optimum symbol rate and carrier frequency determination, in accordance with the present invention, is that optimum parameters may be determined with high accuracy in low signal to noise ratio environments. Yet another advantage of the present invention is that it uses computationally efficient FFTs, increasing efficiency and reducing the time period needed to accurately determine an optimal symbol rate and carrier frequency for a maximal bit rate.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

TABLE A

| Impairment | Symbol rates excluded |
| --- | --- |
| Tandem PCM link | 3429 |
| ADPCM | 3200 & 3429 |
| 1050 Hz to 3750 Hz slope > 28 dB | 3429 |
| 1050 to 150 Hz slope > 30 dB | 3200 & 3429 |

TABLE B

| Impairment | Detected if: |
| --- | --- |
| Tandem PCM link | SDR(LowPower) + 3 dB > SDR(HighPpower) & 1050 Hz to 3750 Hz slope > 28 dB |
| ADPCM link | SDR(LowPower) + 3 dB > SDR(HighPower) & SDR(LowPower) < 32 dB |

TABLE C

| | | Symbol Rate | | |
| --- | --- | --- | --- | --- |
| | | Symbol Rate 1 | Symbol Rate 2 | Symbol Rate last |
| Bit Rate | Bit Rate 1 | SDR(1,1) | SDR(1,2) | SDR(1,last) |
| | Bit Rate 2 | SDR(2,1) | SDR(2,2) | SDR(2,last) |
| | Bit Rate last | SDR(last,1) | SDR(last,2) | SDR(last,last) |

We claim:

1. A method of determining a symbol rate and a carrier frequency for data transmission and reception, from a transmitted probe signal received via a channel, the transmitted probe signal having a sequence of a plurality of tones having predetermined frequency, amplitude and phase characteristics, the transmitted probe signal having a first power level and a second power level, the transmitted probe signal received for a minimum duration for each of the first and second power levels to form a received probe signal having a plurality of sets of received probe tones, each set of received probe tones having a plurality of probe tone frequencies, the method comprising:

(a) measuring an average probe signal level for each probe tone frequency of the received probe signal to form a set of probe signal average power levels;

(b) measuring an average noise level for a plurality of noise frequencies to form a set of average noise levels;

(c) determining a plurality of signal to distortion ratios, each of the plurality of signal to distortion ratios corresponding to a symbol rate and carrier frequency combination from a plurality of combinations of symbol rates and carrier frequencies, to form a set of signal to distortion ratios;

(d) forming a plurality of optimization parameters, the plurality of optimization parameters including the set of signal to distortion ratios; and (e) based upon the plurality of optimization parameters, determining a selected symbol rate and carrier frequency combination from the plurality of combinations of symbol rates and carrier frequencies.

2. The method of claim 1, wherein the selected symbol rate and carrier frequency combination corresponds to an optimal bit rate of a plurality of bit rates.

3. The method of claim 1, further comprising:

(d1) measuring attenuation distortion at a plurality of probe tone frequencies to form an attenuation distortion parameter, the attenuation distortion parameter included in the plurality of optimization parameters.

4. The method of claim 3, wherein the attenuation distortion parameter corresponds to envelope delay distortion.

5. The method of claim 3, further comprising removing a corresponding symbol rate from the plurality of combinations of symbol rates and carrier frequencies, the corresponding symbol rate selected based upon the attenuation distortion parameter.

6. The method of claim 1, further comprising:

(d2) determining a channel characteristic from the set of signal to distortion ratios, the channel characteristic included in the plurality of optimization parameters.

7. The method of claim 6, wherein the determining a channel characteristic step (d2) includes determining whether the channel is a PCM channel.

8. The method of claim 6, wherein the determining step (d2) includes determining whether the channel is a tandem PCM link.

9. The method of claim 6, wherein the determining step (d2) includes determining whether the channel is an ADPCM channel.

10. The method of claim 6, further comprising removing a corresponding symbol rate from the plurality of combinations of symbol rates and carrier frequencies, the corresponding symbol rate selected based upon the channel characteristic.

11. The method of claim 1, wherein the measuring step (a) further comprises:

(a1) sampling the received probe tones to form a set of sampled tones; and (a2) performing a sequence of Fourier transformations of the set of sampled tones to form a plurality of sets of sequential Fourier transforms corresponding to each probe tone frequency and averaging a plurality of magnitudes of the sequential Fourier transforms corresponding to each probe tone frequency to form the set of probe signal average power levels.

12. The method of claim 1, wherein the measuring step (b) further comprises:

determining a set of a plurality of corresponding noise frequencies, each of the plurality of corresponding noise frequencies having a predetermined frequency difference from a probe tone frequency of the plurality of tones of the received probe signal; and determining the set of average noise levels from an average of a plurality of samples of noise levels from the set of a plurality of corresponding noise frequencies.

13. The method of claim 12, wherein step (c) further comprises determining the plurality of signal to distortion ratios from:

$$\frac{1}{SDR} = e^{(\frac{1}{f_{sym}}\int_{f_c-\frac{f_{sym}}{2}}^{f_c+\frac{f_{sym}}{2}} ln(\frac{N(f)}{S(f)+N(f)}) df)}$$

as approximated by $$\frac{1}{SDR} = \left( \prod_i \frac{N(f_i)}{S(f_i)\frac{1B_nB_p}{f_{sym}} + N(f_i)} \right)^{\frac{1}{NumTones}}$$

where the product is over the values of "i" such that $$f_c - \frac{f_{sym}}{2} \leq f_i \leq f_c + \frac{f_{sym}}{2}$$

in which S(f) is a power spectral density of the received probe signal, N(f) is a power spectral density of the set of a plurality of corresponding noise frequencies, in which $f_{sym}$ is a symbol rate and $f_c$ is a carrier frequency corresponding to a symbol rate and carrier frequency combination from the plurality of combinations of symbol rates and carrier frequencies, NumTones is a number of tones of the probe signal plus a number of corresponding noise frequencies included in the summation, "$TB_n$" is a correction factor for a noise power spectrum, $B_n$ is a noise bandwidth parameter, and "$B_p/f_{sym}$" is a correction factor for a received probe signal power spectrum.

14. The method of claim 12, wherein step (c) further comprises determining the plurality of signal to distortion ratios from:

$$log(SDR) = \frac{1}{NumTones} \sum_i log\left( S(f_i)\frac{TB_nB_p}{f_{sym}} + N(f_i) \right) - log(N(f_i))$$

in which S(f) is a power spectral density of the received probe signal, N(f) is a power spectral density of the set of a plurality of corresponding noise frequencies, $f_{sym}$ is a symbol rate and $f_c$ is a carrier frequency corresponding to a symbol rate and carrier frequency combination from the plurality of combinations of symbol rates and carrier frequencies, $f_i$ is a frequency of an $i^{th}$ tone of the received probe signal, $\Sigma$ is a summation over values "i" such that $$f_c - \frac{f_{sym}}{2} \leq f_i \leq f_c + \frac{f_{sym}}{2},$$

NumTones is a number of tones of the probe signal plus a number of corresponding noise frequencies included in the summation, "$TB_n$" is a correction factor for a noise power spectrum, $B_n$ is a noise bandwidth parameter, and "$B_p/f_{sym}$" is a correction factor for a received probe signal power spectrum.

15. The method of claim 1, wherein the measuring step (b) further comprises:

(b1) sampling noise received together with the received probe signal to form a set of sampled noise;

(b2) performing a sequence of Fourier transformations of the set of sampled noise to form a plurality of sets of sequential Fourier transforms for each corresponding noise frequency of the set of the plurality of corresponding noise frequencies and averaging a plurality of magnitudes of the sequential Fourier transforms for each corresponding noise frequency to form the set of average noise levels.

16. A modem for data transmission and reception, the modem having an initial training period for determining a transmit power level from a transmitted probe signal received via a channel, the transmitted probe signal having a sequence of a plurality of tones having predetermined frequency, amplitude and phase characteristics, the transmitted probe signal having a first power level and a second power level, the transmitted probe signal received for a minimum duration for each of the first and second power levels to form a plurality of sets of transmitted tones, the modem comprising:

a data access arrangement coupleable to the channel to receive the transmitted probe signal, to form a received probe signal;

an analog-digital converter coupled to the data access arrangement to sample and convert the received probe signal to form a plurality of sets of received probe tones; and a processor coupled to the analog-digital converter to receive the plurality of sets of received probe tones, the processor responsive to determine an average probe signal level for each tone frequency of the plurality of sets of received probe tones to form a set of probe signal average power levels, and to determine an average noise level for a plurality of noise frequencies to form a set of average noise levels; the processor further responsive to determine a plurality of signal to distortion ratios, each of the plurality of signal to distortion ratios corresponding to a symbol rate and carrier frequency combination from a plurality of combinations of symbol rates and carrier frequencies, to form a set of signal to distortion ratios; the processor further responsive to form a plurality of optimization parameters, the plurality of optimization parameters including the set of signal to distortion ratios; and based upon the plurality of optimization parameters, the processor further responsive to determine a selected symbol rate and carrier frequency combination from the plurality of combinations of symbol rates and carrier frequencies.

17. The modem of claim 16, wherein the selected symbol rate and carrier frequency combination corresponds to an optimal bit rate of a plurality of bit rates.

18. The modem of claim 16, wherein the processor is further responsive to measure attenuation distortion at a plurality of probe tone frequencies to form an attenuation distortion parameter, the attenuation distortion parameter included in the plurality of optimization parameters.

19. The modem of claim 18, wherein the attenuation distortion parameter corresponds to envelope delay distortion.

20. The modem of claim 18, the processor further responsive to remove a corresponding symbol rate from the plurality of combinations of symbol rates and carrier frequencies, the corresponding symbol rate selected by the processor based upon the attenuation distortion parameter.

21. The modem of claim 16, wherein the processor is further responsive to determine a channel characteristic from the set of signal to distortion ratios, the channel characteristic included in the plurality of optimization parameters.

22. The modem of claim 21, wherein the processor is further responsive to determine whether the channel is a PCM channel to form the channel characteristic.

23. The modem of claim 21, wherein the processor is further responsive to determine whether the channel is a tandem PCM rink to form the channel characteristic.

24. The modem of claim 21, wherein the processor is further responsive to determine whether the channel is an ADPCM channel to form the channel characteristic.

25. The modem of claim 21, wherein the processor is further responsive to remove a corresponding symbol rate from the plurality of combinations of symbol rates and carrier frequencies, the corresponding symbol rate selected by the processor based upon the channel characteristic.

26. The modem of claim 16, wherein:

the analog-digital converter samples the received probe tones to form a set of sampled tones; and the processor is further responsive to perform a sequence of Fourier transformations of the set of sampled tones to form a plurality of sets of sequential Fourier transforms corresponding to each probe tone frequency and averaging a plurality of magnitudes of the sequential Fourier transforms corresponding to each probe tone frequency to form the set of probe signal average power levels.

27. The modem of claim 16, wherein the processor is further responsive to determine a set of a plurality of corresponding noise frequencies, each of the plurality of corresponding noise frequencies having a predetermined frequency difference from a probe tone frequency of the plurality of tones of the received probe signal; and to determine the set of average noise levels from an average of a plurality of samples of noise levels from each of the plurality of corresponding noise frequencies.

28. The modem of claim 27, wherein the processor is further responsive to determine the plurality of signal to distortion ratios from:

$$\frac{1}{SDR} = e^{\left(-\frac{1}{f_{sym}}\right)} \int_{f_c-\frac{f_{sym}}{2}}^{f_c+\frac{f_{sym}}{2}} \ln\left(\frac{N(f)}{S(f)+N(f)}\right) df$$

as approximated by $$\frac{1}{SDR} = \left(\prod_i \frac{N(f_i)}{S(f_i)\frac{1B_n B_p}{f_{sym}} + N(f_i)}\right)^{\frac{1}{NumTones}}$$

where the product is over the values of "i" such that $$f_c - \frac{f_{sym}}{2} \leq f_i \leq f_c + \frac{f_{sym}}{2}$$

in which S(f) is a power spectral density of the received probe signal, N(f) is a power spectral density of the set of corresponding noise frequencies, in which $f_{sym}$ is a symbol rate and $f_c$ is a carrier frequency corresponding to a symbol rate and carrier frequency combination from the plurality of combinations of symbol rates and carrier frequencies, NumTones is a number of tones of the probe signal plus a number of corresponding noise frequencies included in the summation, "$TB_n$" is a correction factor for a noise power spectrum, $B_n$ is a noise bandwidth parameter, and "$B_p/f_{sym}$" is a correction factor for a received probe signal power spectrum.

29. The modem of claim 27, wherein the processor is further responsive to determine the plurality of signal to distortion ratios from:

$$\log(SDR) = \frac{1}{NumTones} \sum_i \log\left( S(f_i) \frac{TB_n B_p}{f_{sym}} + N(f_i) \right) - \log(N(f_i))$$

in which $S(f)$ is a power spectral density of the received probe signal, $N(f)$ is a power spectral density of the set of a plurality of corresponding noise frequencies, $f_{sym}$ is a symbol rate and $f_c$ is a carrier frequency corresponding to a symbol rate and carrier frequency combination from a plurality of combinations of symbol rates and carrier frequencies, $f_i$ is the frequency of the $i^{th}$ one of the probe signal, $\Sigma$ is a summation over values "i" such that $$f_c - \frac{f_{sym}}{2} \leq f_i \leq f_c + \frac{f_{sym}}{2},$$

NumTones is a number of tones of the probe signal plus a number of corresponding noise frequencies included in the summation, "$TB_n$" is a correction factor for a noise power spectrum, $B_n$ is a noise bandwidth parameter, and "$B_p/f_{sym}$" is a correction factor for a received probe signal power spectrum.

30. The modem of claim 27, wherein:

the analog-digital converter samples noise received together with the received probe signal to form a set of sampled noise; and the processor is further responsive to perform a sequence of Fourier transformations of the set of sampled noise to form a plurality of sets of sequential Fourier transforms for each corresponding noise frequency of the set of the plurality of corresponding noise frequencies and averaging a plurality of magnitudes of the sequential Fourier transforms for each corresponding noise frequency to form the set of average noise levels.

* * * * *

UNITED STATES PATENT AND TRADEMARK OFFICE
CERTIFICATE OF CORRECTION

PATENT NO.   : 5,715,277
DATED        : February 3, 1998
INVENTOR(S)  : Richard L. Goodson, Lee T. Gusler Jr., Gary D. Hunt, Mickey C. Rushing It is certified that error appears in the above-identified patent and that said Letters Patent is hereby corrected as shown below:

Column 13, claim 7
Line 36 & 37, delete " a channel characteristic"

Column 16, claim 23,
Line 6, delete "rink" and substitute -- link --

Column 17 claim 29,
Line 13, delete "one" and substitute -- tone --

Signed and Sealed this

Twenty-eighth Day of August, 2001

Attest:

*Attesting Officer*

NICHOLAS P. GODICI
*Acting Director of the United States Patent and Trademark Office*